United States Patent
Kanaya et al.

(10) Patent No.: US 8,140,918 B2
(45) Date of Patent: Mar. 20, 2012

(54) CLOCK SUPPLY METHOD AND INFORMATION PROCESSING APPARATUS

(75) Inventors: Hideharu Kanaya, Kawasaki (JP); Akiko Ootoshi, Kawasaki (JP); Takashi Koguchi, Kawasaki (JP); Kensuke Ishida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/713,295

(22) Filed: Feb. 26, 2010

(65) Prior Publication Data

US 2010/0229034 A1 Sep. 9, 2010

(30) Foreign Application Priority Data

Mar. 5, 2009 (JP) ................................. 2009-052382

(51) Int. Cl.
*G06F 11/00* (2006.01)

(52) U.S. Cl. ............... 714/55; 714/3; 714/4.11; 714/12; 713/500

(58) Field of Classification Search ............. 714/3, 4.11, 714/12, 55; 713/500
See application file for complete search history.

(56) References Cited

U.S. PATENT DOCUMENTS

| | | | | |
|---|---|---|---|---|
| 4,490,581 A | * | 12/1984 | Edwards et al. | 379/279 |
| 5,444,714 A | * | 8/1995 | Yun | 714/4.1 |
| 5,467,466 A | * | 11/1995 | Carlson | 713/501 |
| 5,594,896 A | * | 1/1997 | Carlson | 713/501 |
| 5,852,728 A | * | 12/1998 | Matsuda et al. | 713/501 |
| 2005/0149775 A1 | * | 7/2005 | Van Den Berg | 714/1 |
| 2007/0156937 A1 | | 7/2007 | Seong et al. | |

FOREIGN PATENT DOCUMENTS

| | | |
|---|---|---|
| CN | 1996276 | 7/2007 |
| CN | 101196838 | 6/2008 |
| JP | 05-244132 | 9/1993 |

OTHER PUBLICATIONS

Chinese Office Action for corresponding Chinese Application 201010127209.6; issued Aug. 26, 2011.

* cited by examiner

*Primary Examiner* — Charles Ehne
(74) *Attorney, Agent, or Firm* — Staas & Halsey LLP (57) ABSTRACT

A clock supply method for supplying a clock to a plurality of processing units includes supplying a clock from a first clock supply unit to processing units forming a first group as a primary clock and to processing units forming a second group as a standby clock; supplying a clock from a second clock supply unit including a clock source different from that of the first clock supply unit to the processing units forming the second group as a primary clock and to the processing units forming the first group as a standby clock; and when a processing unit in the first or second group detects an abnormality of the primary clock, switching the standby clock into use in place of the primary clock being supplied to the processing units that has detected the abnormality belongs; wherein the first and second clock supply units supply clocks with the same frequency.

13 Claims, 11 Drawing Sheets

| INPUT | | | OUTPUT | | |
|---|---|---|---|---|---|
| /1A | 1B | /1CLR | 1Q | /1Q | |
| ↓ | H | H | ⊓ | ⊔ | OUTPUT ENABLE |
| X | L | H | L | H | INHIBIT |
| H | X | H | L | H | INHIBIT |
| L | ↑ | H | ⊓ | ⊔ | OUTPUT ENABLE |
| L | H | ↑ | ⊓ | ⊔ | OUTPUT ENABLE |
| X | X | L | L | H | RESET |

X:Don't Care

CLOCK SUPPLY METHOD AND INFORMATION PROCESSING APPARATUS

CROSS REFERENCE TO RELATED APPLICATION

This application is based upon and claims the benefit of priority from the prior Japanese Patent Application NO. 2009-052382 filed on Mar. 5, 2009, the entire contents of which are incorporated herein by reference.

FIELD

The embodiments discussed herein are related to a clock supply method and an information processing apparatus.

BACKGROUND

Figure 1:
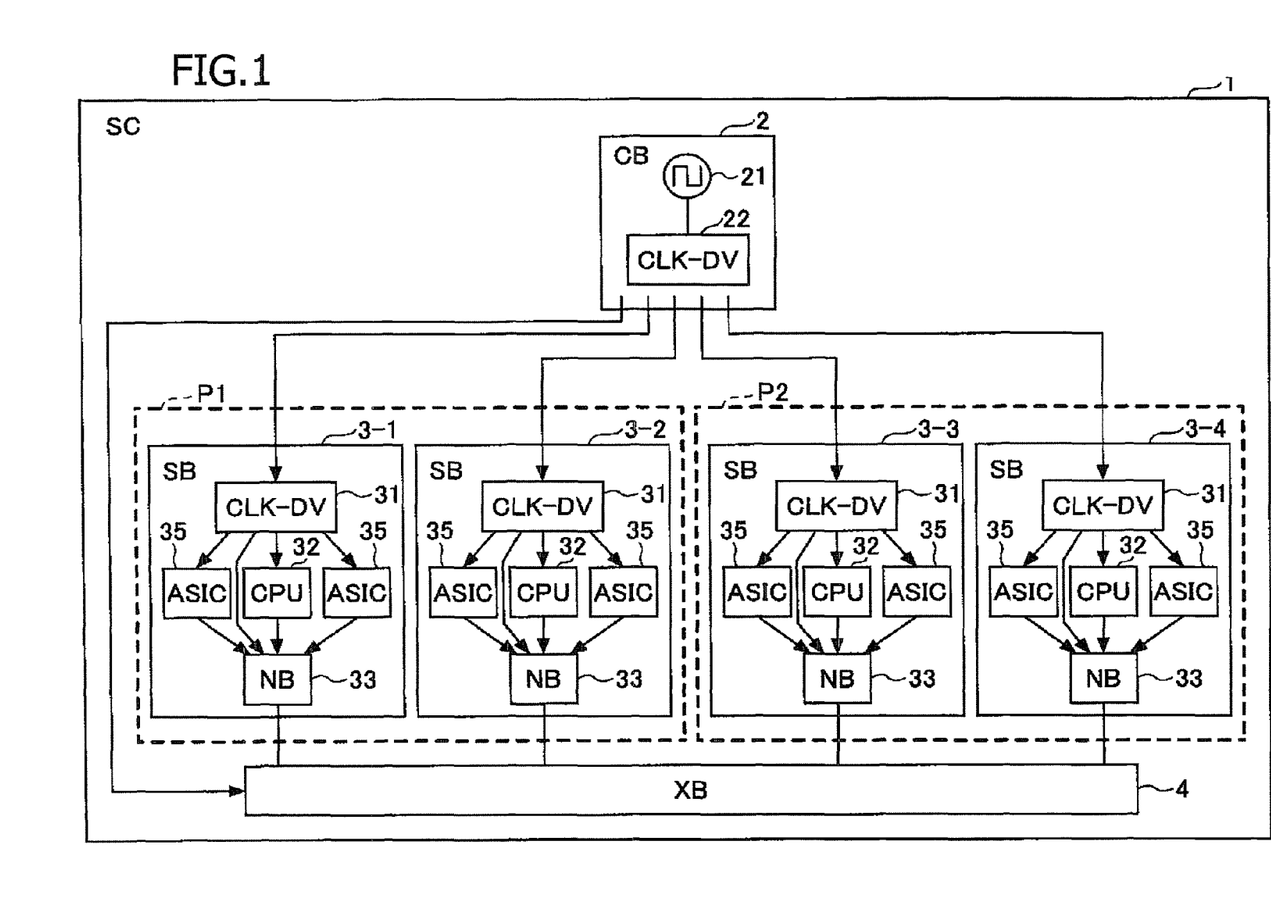
FIG. 1 is a block diagram illustrating a portion of a conventional information processing apparatus.

FIG. 1 is a block diagram illustrating a portion of an exemplary information processing apparatus. The information processing apparatus illustrated in FIG. 1 is a so-called multiprocessor system.

A sever chassis (SC) 1 forming a multiprocessor system includes a clock board (CB) 2, multiple system boards (SBs) 3-1 to 3-4, and a crossbar switch (XB) 4. The CB 2 includes a clock source 21 generating a clock (or clock signal) and a clock driver (CLK-DV) 22 distributing the clock. Each of the SBs 3-1 to 3-4 includes a clock driver (CLK-DV) 31, a CPU 32, application specific integrated circuits (ASICs) 35 which forms a chip set, and a north-bridge (NB) 33.

The CLK-DV 22 distributes and supplies the clock to the SBs 3-1 to 3-4 and the XB 4. The CLK-DV 31 in each of the SBs 3-1 to 3-4 distributes and supplies the clock to the CPU 32, the ASICs 35, and the NB 33 in the SB. The CPU 32 in each of the SBs 3-1 to 3-4 is connected to the CPU 32 in another SB through the NB 33 in that SB and the XB 4. For purposes of illustration, FIG. 1 depicts the information processing apparatus partitioned into two partitions: Partition P1 formed by the SBs 3-1 and 3-2 and partition P2 formed by the SBs 3-3 and 3-4.

Since the XB 4 in the multiprocessor system in FIG. 1 is shared by the SBs 3-1 to 3-4 independently of partitions P1 and P2, the NB 33 in each of the SBs 3-1 to 3-4 needs to be synchronized with the XB 4 by a clock. For that purpose, the single CB 2, specifically the single clock source 21, supplies a single clock to the SBs 3-1 to 3-4 and the XB 4. Since only the single clock source 21 is used, a failure of the clock source 21 results in a failure of the entire multiprocessor system, including both partitions P1 and P2.

Duplexed clock supply systems have been proposed in which a clock from a single clock source is duplicated and distributed to two channels (see Japanese Laid-Open Patent Publication No. 5-244132, for example). However, if the clock source fails, the entire system fails, including the both partitions P1 and P2.

In a multiprocessor system using a partitioned cluster, if one of the partitions that form the cluster fails, the other partition takes over the task of the failed partition. However, if the partitions fail at the same time due to a failure of the clock source, the entire system fails.

[Patent Document 1] Japanese Laid-open Patent Publication No. 5-244132

The conventional clock supply methods have a problem that a failure of a clock source results in a failure of the entire system.

An object of the present invention is to provide a clock supply method and an information processing apparatus capable of minimizing the probability of the entire system failing due to a failure of a clock source.

SUMMARY

According to one aspect of the embodiments, there is provided a clock supply method for supplying a clock to a plurality of processing units. The method includes: supplying a clock from a first clock supply unit to processing units forming a first group among the plurality of processing units as a primary clock and to processing units forming a second group among the plurality of processing units as a standby clock; supplying a clock from a second clock supply unit including a clock source different from that of the first clock supply unit to the processing units forming the second group among the plurality of processing units as a primary clock and to the processing units forming the first group among the plurality of processing units as a standby clock; and when a processing unit in the first or second group detects an abnormality of the primary clock supply, switching the standby clock into use in place of the primary clock being supplied to the processing units in the group to which the processing unit that has detected the abnormality belongs; wherein the first and second clock supply units supply clocks with the same frequency and none of the plurality of processing units belong to both of the first and second groups at the same time.

The object and advantages of the embodiments will be realized and attained by means of the elements and combinations particularly pointed out in the claims.

It is to be understood that both the foregoing general description and the following detailed description and are exemplary and explanatory and are not restrictive of the embodiments, as claimed.

DESCRIPTION OF EMBODIMENTS

In a clock supply method and an information processing apparatus disclosed herein, a clock from a first clock supply unit is supplied to processing units forming of a first group as a primary clock and to processing units forming a second group as a standby clock. A clock from a second clock supply unit is supplied to the processing units forming the second group as a primary clock and to the processing units forming the first group as a standby clock. When any of the processing units in the first or second group detects an abnormality of the primary clock supply, the standby clock is switched into use to supply to the processing units in the group to which the processing unit that has detected the abnormality belongs, in place of the primary clock.

Assumption here is that the information processing apparatus is a partitioned system and clocks supplied to the different partitions are not in synchronization with each other. Since the separate clock sources used as primary clock sources are provided for the separate partitions, the partition (s) supplied with the primary clock from the functioning clock source can keep operating if one of the clock sources fails. Thus, the probability of the entire system failing due to a failure of a clock source can be minimized.

Clock supply methods and information processing apparatuses according to embodiments of the present invention will be described with reference to the FIGS. 2 through 11.

Figure 2:
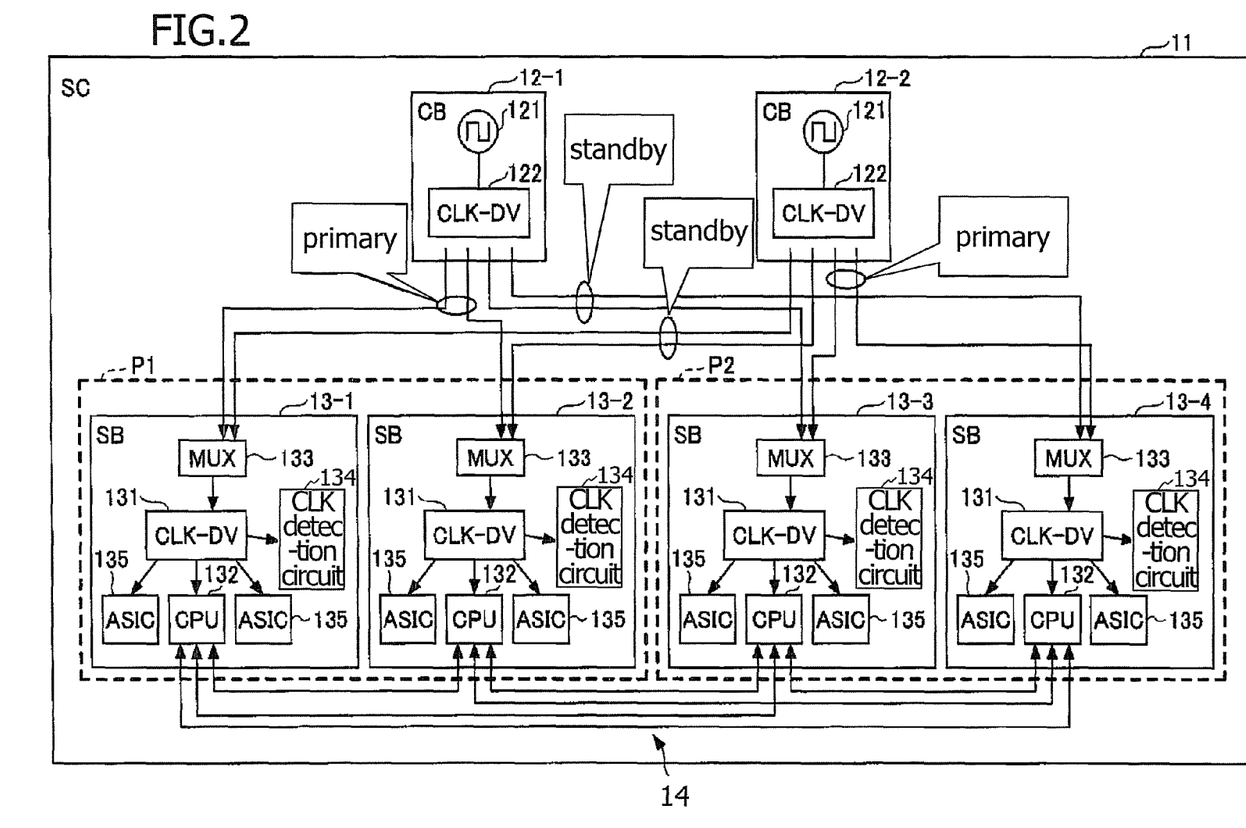
FIG. 2 is a block diagram illustrating a portion of an information processing apparatus according to a first embodiment of the present invention.

FIG. 2 is a block diagram illustrating a portion of an information processing apparatus according to a first embodiment of the present invention. The information processing apparatus illustrated in FIG. 2 is a so-called multiprocessor system.

A server chassis (SC) 11 which forms the multiprocessor system includes multiple clock boards (CB) 12-1, 12-2, and multiple system boards (SB) 13-1 to 13-4. Each of the CBs 12-1, 12-2 forms a clock supply unit (or clock supply means) including a clock source 121 generating a clock (or a clock signal) and a clock driver (CLK-DV) 122 distributing and supplying the clock. Each of the SBs 13-1 to 13-4 forms a processing unit (or processing means) including a clock driver (CLK-DV) 131, a CPU 132, application specific integrated circuits (ASIC) 135 which form a chip set, a multiplexer (MUX) 133, a clock detection circuit 134, and connection means such as lines 14 each interconnecting the CPU 132 to the CPU 132 of another SB on a one-to-one basis.

The CLK-DV 122 of each CB 12-1, 12-2 distributes and supplies a clock to the SBs 13-1 to 13-4. The MUX 133 in each of the SB 13-1 to 13-4 selects a clock from the primary one of CBs 12-1, 12-2 and supplies the clock to the CLK-DV 131. The CBs 12-1, 12-2 output clocks with the same frequency. In each of the SBs 13-1 to 13-4, the CLK-DV 131 distributes and supplies the clock to the CPU 132 and the ASICs 135 in that SB and the clock detection circuit 134 determines whether a clock supplied to the CLK-DV 131 is correct or not, or whether there is an abnormality of clock supply. If the clock detection circuit 134 in the SB 13-1 to 13-4 detects an abnormality of clock supply, the MUX 133 switches from the clock from the CB in operation (the primary CB) to the clock from the standby CB. The MUX 133 forms a switching circuit (or switching means) which switches the clock from primary to standby. In the example in FIG. 2, the CB 12-1 acts as the primary CB for Partition P1 and as the standby CB for Partition P2; the CB 12-2 acts as the standby CB for partition P1 and as the primary CB for partition P2.

The CPU 132 in each of the SBs 13-1 to 13-4 is connected to the CPU 132 in another SB through a line 14 on a one-to-one basis. For purposes of illustration, FIG. 2 depicts the information processing apparatus including two partitions and the SBs 13-1 and 13-2 form partition P1 and the SBs 13-3 and 13-4 form partition P2. The clocks being supplied to the partitions are not in synchronization with each other in the partitioned information processing apparatus.

In the example in FIG. 2, the clock from the clock source 121 of the CB 12-1 is supplied to the SBs 13-1 and 13-2 of partition P1 as the primary clock and can also be supplied to the SBs 13-3 and 13-4 of partition P2 as the standby clock. The clock from the clock source 121 of the CB 12-2 is supplied to the SBs 13-3 and 13-4 of partition P2 as the primary clock and can also be supplied to the SBs 13-1 and 13-2 of partition P1 as the standby clock. If CB 12-1 fails due to a failure such as a failure of its clock source 121, switchover is made from the primary-clock-supplying CB 12-1 to the standby-clock-supplying CB 12-2, then the SBs 13-1 and 13-2 are rebooted, and the clock is supplied from the functioning CB 12-2 to the SBs 13-1 and 13-2. Similarly, if the CB 12-2 fails due to a failure such as a failure of its clock source 121, switchover is made from the primary-clock-supplying CB 12-2 to the standby-clock supplying CB 12-1, then the SBs 13-3 and 13-4 are rebooted, and the clock is supplied from the CB 12-1 to the SBs 13-3 and 13-4.

In this way, the dual CB system as a dual clock source system is provided so that each of the CBs can distribute either primary or standby clock to the SBs. Furthermore, different partitions are assigned different CBs as primary CB. Therefore, if a primary CB fails, the partition or partitions that are supplied with a primary clock signal from the functioning CB can keep operating without causing entire system down. The failed partition becomes operable by switching over to the standby CB. Moreover, the provision of more then one CB can reduce downtime because a failed primary CB can be repaired or replaced while the standby CB is switched into use and being used.

The number of CBs is not limited to two; more than two CBs may be provided. The number of SBs is not limited to four; two or more SBs may be provided. The number of CPUs in an SB is not limited to one; one or more CPUs may be provided in an SB. The number of partitions is not limited to two. If multiple CPUs are provided in an SB, the CPUs are interconnected with each other and with the CPU in another SB on a one-to-one basis.

Figure 3:
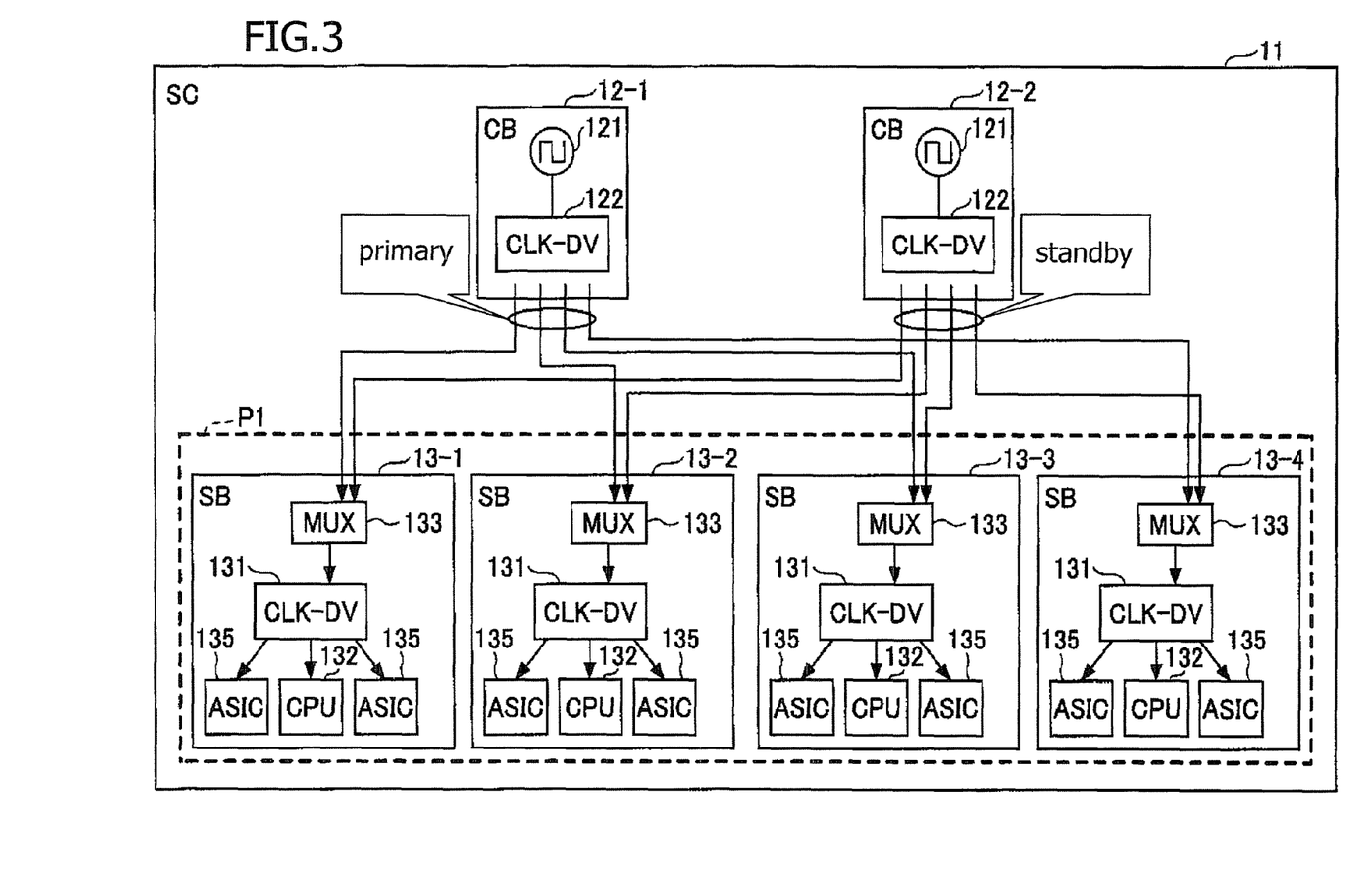
FIG. 3 is a block diagram illustrating a portion of an information processing apparatus including one partition.

FIG. 3 is a block diagram illustrating an information processing apparatus including only one partition. Components in FIG. 3 that are the same as those in FIG. 2 are labeled the same numerals and description of those components will be omitted. While for convenience of illustration the lines 14 and the clock detection circuit 134 are omitted from FIG. 3, and FIGS. 4 and 5, which will be described later, the CPU 132 in each of the SBs 13-1 to 13-4 is interconnected to the CPU 132 in another SB through the line 14 on a one-to-one basis.

In an information processing apparatus including only one partition, a clock from the clock source 121 of the CB 12-1 can be supplied to SBs 13-1 to 13-4 forming partition P1 as a primary clock and a clock from the clock source 121 of the CB 12-2 can be supplied to SBs 13-1 to 13-4 forming partition P1 as a standby clock. If the CB 12-1 fails due to a failure such as a failure of the clock source 121 of the CB 12-1, switchover is made from the primary CB 12-1 to the standby CB 12-2, then the SBs 13-1 to 13-4 are rebooted, and the clock from CB 12-2 can be supplied to the SBs 13-1 to 13-4.

Figure 4:
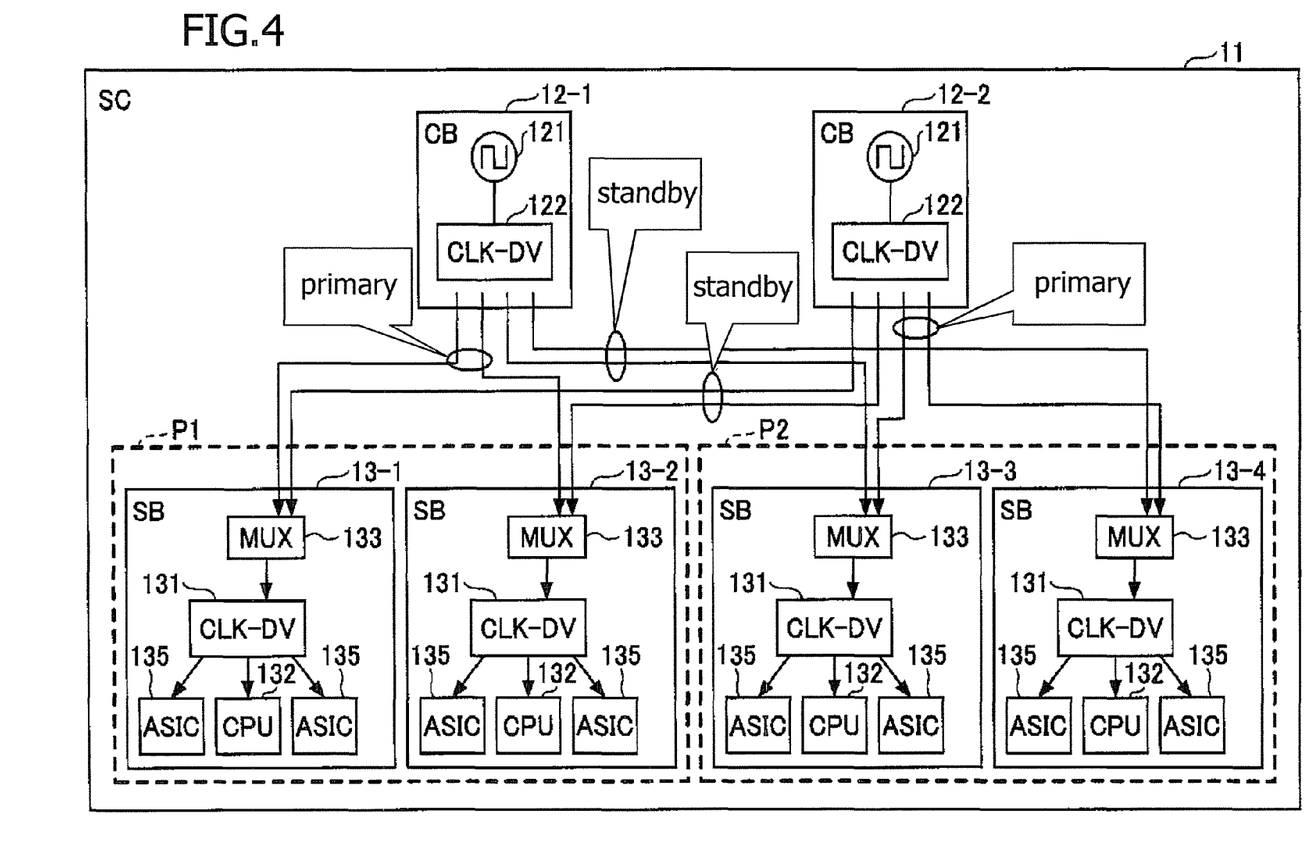
FIG. 4 is a block diagram illustrating a portion of an information processing apparatus including two partitions.

FIG. 4 is a block diagram illustrating an information processing apparatus including two partitions. The same components in FIG. 4 as those in the FIG. 2 are labeled the same reference numerals and the description of those components will be omitted.

In the information processing apparatus including two partitions, a clock from the clock source 121 of the CB 12-1 can be supplied to SBs 13-1 and 13-2 forming partition P1 as a primary clock and can be supplied to SBs 13-3 and 13-4 forming the partition P2 as a standby clock. A clock from the clock source 121 of the CB 12-2 is provided to the SBs 13-3 and 13-4 forming partition 2 as a primary clock and can be supplied to the SBs 13-1 and 13-2 forming partition 1 as a standby clock. If the CB 12-1 fails due to a failure such as a failure of its clock source 121, switchover is made from the primary-clock-supplying CB 12-1 to the standby-clock-supplying CB 12-2, then the SBs 13-1 and 13-2 are rebooted, and the clock is supplied from the functioning CB 12-2 to the SBs 13-1 and 13-2. Similarly, if the CB 12-2 fails due to a failure such as a failure of its clock source 121, switchover is made from the primary-clock-supplying CB 12-2 to the standby-clock-supplying CB 12-1, then the SBs 13-3 and 13-4 are rebooted, and the clock is supplied from the functioning CB 12-1 to the SBs 13-3 and 13-4.

Figure 5:
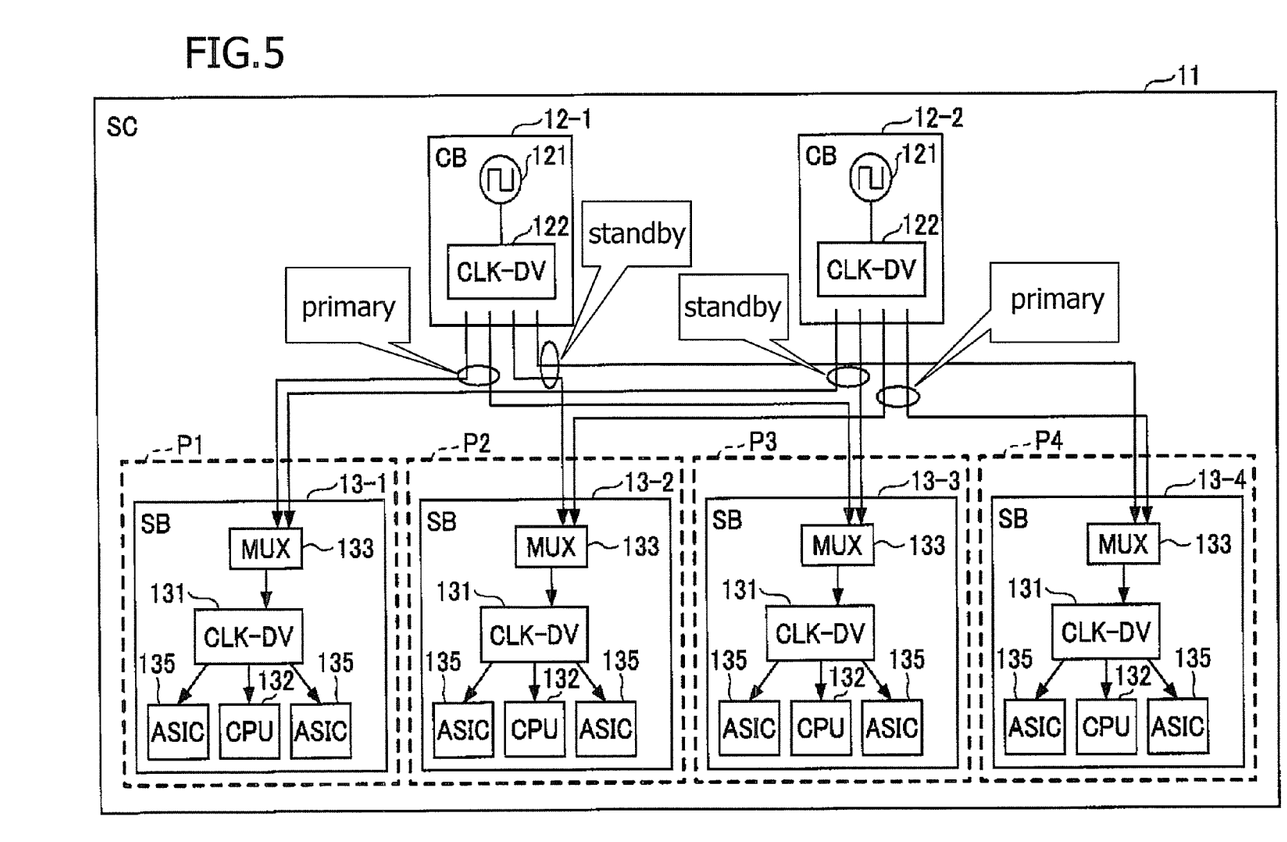
FIG. 5 is a block diagram illustrating a portion of an information processing apparatus including four partitions.

FIG. 5 is a block diagram illustrating an information processing apparatus partitioned into four partitions. Components in FIG. 5 that are the same as those in FIG. 2 are labeled the same reference numerals and description of those components will be omitted. For convenience of illustration, it is assumed here that partitions P1 and P2 form a cluster and partitions P3 and P4 form another cluster.

In the information processing apparatus partitioned into four partitions, a clock from the clock source 121 of the CB 12-1 is supplied to SBs 13-1 and 13-3 forming partition P1 and P3, respectively, as the primary clock and can also be supplied to SBs 13-2 and 13-4 forming partitions P2 and P4, respectively, as the standby clock. A clock from the clock source 121 of the CB 12-2 is supplied to the SBs 13-2 and 13-4 forming partitions P2 and P4, respectively, as the primary clock and can also be supplied to the SBs 13-1 and 13-3 forming partitions P1 and P3, respectively, as the standby clock. If the CB 12-1 fails due to a failure such as a failure of its clock source 121, switchover is made from the primary-clock-supplying CB 12-1 to the standby-clock-supplying CB 12-2, then the SBs 13-1 and 13-3 are rebooted, and the clock from the functioning CB 12-2 is supplied to the SBs 13-1 and 13-3. Similarly, if the CB 12-2 fails due to a failure such as a failure of its clock source 121, switchover is made from the primary-clock-supplying CB 12-2 to the standby-clock-supplying CB 12-1, then the SBs 13-2 and 13-4 are rebooted, and the clock is supplied from the functioning CB 12-1 to the SBs 13-2 and 13-4.

From the foregoing, the SBs in a group supplied with the primary clock from the same CB may form the same partition or different partitions in the present embodiment. Different partitions may be assigned different clock sources as primary CB. Therefore, if one of the clock sources fails, the partitions supplied with the primary clock from the functioning clock source can keep operating. Accordingly, the probability of the entire system failing due to a failure of the clock source can be minimized.

Figure 6:
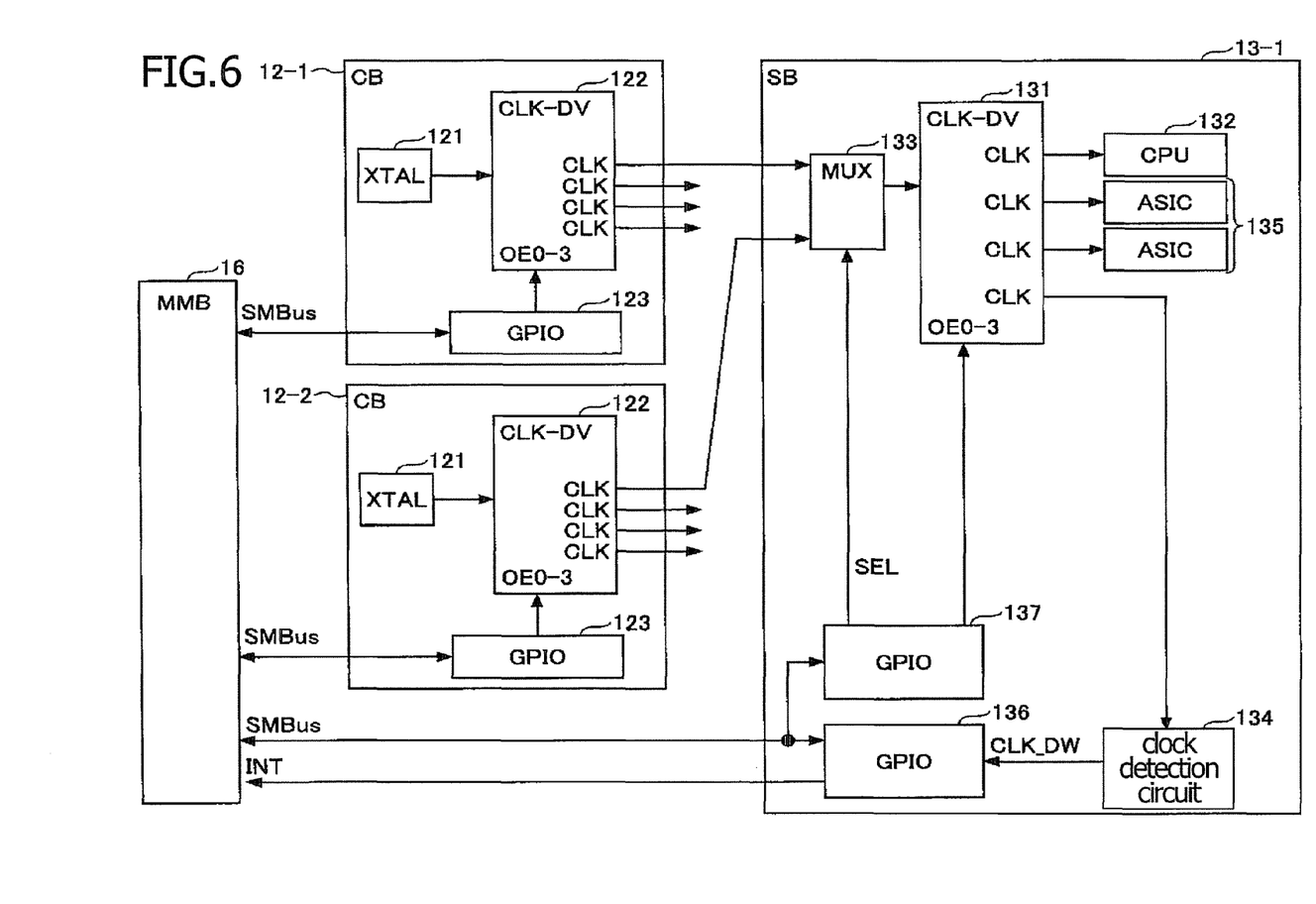
FIG. 6 is a block diagram illustrating a configuration of a portion of the information processing apparatus in FIG. 2 in further detail.

FIG. 6 is a block diagram illustrating a configuration of a portion of the information processing apparatus in FIG. 2 in further detail. In FIG. 6, each of the CBs 12-1 and 12-2 includes a clock source 121 which is a crystal oscillator (XTAL), a CLK-DV 122, and a general purpose input output (GPIO) interface 123 for clock control. The SB 13-1 includes a CLK-DV 131, a CPU 132 (more than one may be provided but only one is depicted by way of example), a multiplexer (MUX) 133, a clock detection circuit 134, application specific integrated circuits (ASIC) 135 (two is depicted by way of example) which form a chip set, a GPIO interface 136 for error status, and a GPIO interface 137 for clock control. The other SBs 13-2 to 13-4 have the same configuration as the SB 13-1 and are therefore omitted from FIG. 6. The GPIO interface 123 in each of the CBs 12-1 and 12-2 and the GPIO interfaces 136 and 137 in each of the SBs 13-1 to 13-4 are connected to a management board (MMB) 16 provided in the SC 11. The MMB 16 constitutes a management unit responsible for controlling and managing the SC 11, that is, the entire system.

The GPIO interface 123 in each of the CBs 12-1 and 12-2 is controlled by the MMB 16 through a system management bus (SMBus) and controls the CLK-DV 122 in the CB 12-1, 12-2.

The CLK-DV 131 in the SB 13-1 distributes a clock CLK supplied to it through the MUX 133 to the CPU 132, the clock detection circuit 134, and ASICs 135. The GPIO interface 137 is controlled by the MMB 16 through the SMBus and is responsible for controlling the MUX 133 and the CLK-DV 131 in the SB 13-1. The GPIO interface 136 is controlled by the MMB 16 through the SMBus, holds error status indicating an error in the SB 13-1 and, when a clock error bit is set, generates an interrupt (INT) to the MMB 16. The clock detection circuit 134 is a multi-vibrator which detects whether or not a clock CLK is being properly output from the CLK-DV 131, that is, examines the clock CLK for an abnormality.

The CLK-DV 122 may be an IC (Integrated Circuits) such as ICS932S421C from Integrated Device Technology (IDT), for example. The CLK-DV 131 may be an IC such as IC9EX21801A from IDT, for example. The MUX 133 may be an IC such as ICS557-08 from IDT, for example. The GPIO interfaces 123, 136 and 137 may be ICs such as PCA9555 from NXP, for example. Since the clock CLK handled by these types of CLK-DV and MUX is a differential signal, the clock detection circuit 134 has a converter circuit that converts the differential signal to a single-ended signal. The converter circuit may be an IC such as ICS830261 from IDT, for example.

If the minimum trigger time for the multi-vibrator does not meet an input clock frequency, frequency division needs to be performed by using a frequency divider including flip-flops or the like. The frequency divider may be an IC such as SN74LVC74A from Texas Instruments (TI), for example.

Operation of the information processing apparatus in which the SB 13-1 uses a clock CLK from the CB 12-1 as the primary clock and a clock from the CB 12-2 as the standby clock will be described below by way of example by following the procedure including steps S1 through S10.

Step S1: In order to select the primary clock CLK, the MMB 16 makes a setting such that a select signal SEL output form the GPIO interface 137 of the SB 13-1 to the MUX 133 causes the MUX 133 to select the clock CLK from the CB 12-1.

Step S2: In order to allow the primary clock CLK to be output from the CB 12-1, the MMB 16 makes a setting on the GPIO interface 123 in the CB 12-1 to place the CLK-DV 122 in the CB12-1 in the output-enabled state. The assumption here is that supply of both primary and standby clocks CLK is inhibited at power-on of the system.

Step S3: In order to start supply of the clock CLK to each CPU 132, the clock detection circuit 134, and each ASIC 135 in the SB 13-1, the MMB 16 makes a setting on the GPIO interface 137 in the SB 13-1 to place the CLK-DV 131 in the output-enabled state.

Step S4: An abnormality of the clock CLK supply is detected by the clock detection circuit 134. When the supply of the clock CLK to the SB 13-1 stops due to a failure of the CB 12-1, the clock detection circuit 134 detects a loss of the leading edge of the input signal (clock CLK). Accordingly, the clock detection circuit 134 outputs a low-level signal (hereinafter called L-level signal), for example. The L-level signal is then set in the GPIO interface 136 as a clock error bit. Because the supply of the clock CLK has stopped, the SB 13-1 initiates a shutdown procedure and then stops operating. Switchover is made to the standby clock CLK and then a procedure for rebooting the SB 13-1 is performed.

Figure 7:
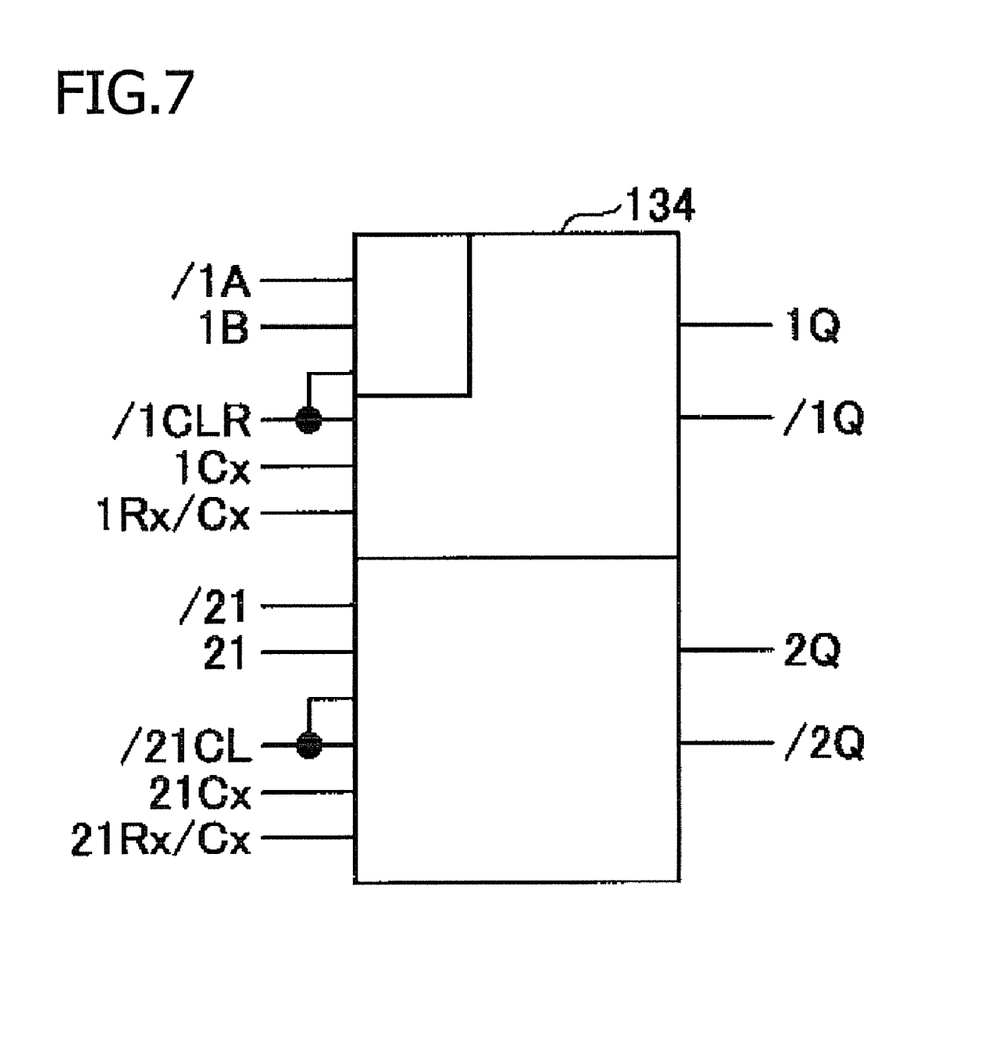
FIG. 7 is a diagram illustrating a clock detection circuit.

FIG. 7 is a diagram illustrating a clock detection circuit 134. The clock detection circuit 134 in FIG. 7 is a chip (multi-vibrator) HC123A from Toshiba Semiconductor Company, for example.

Figure 8:
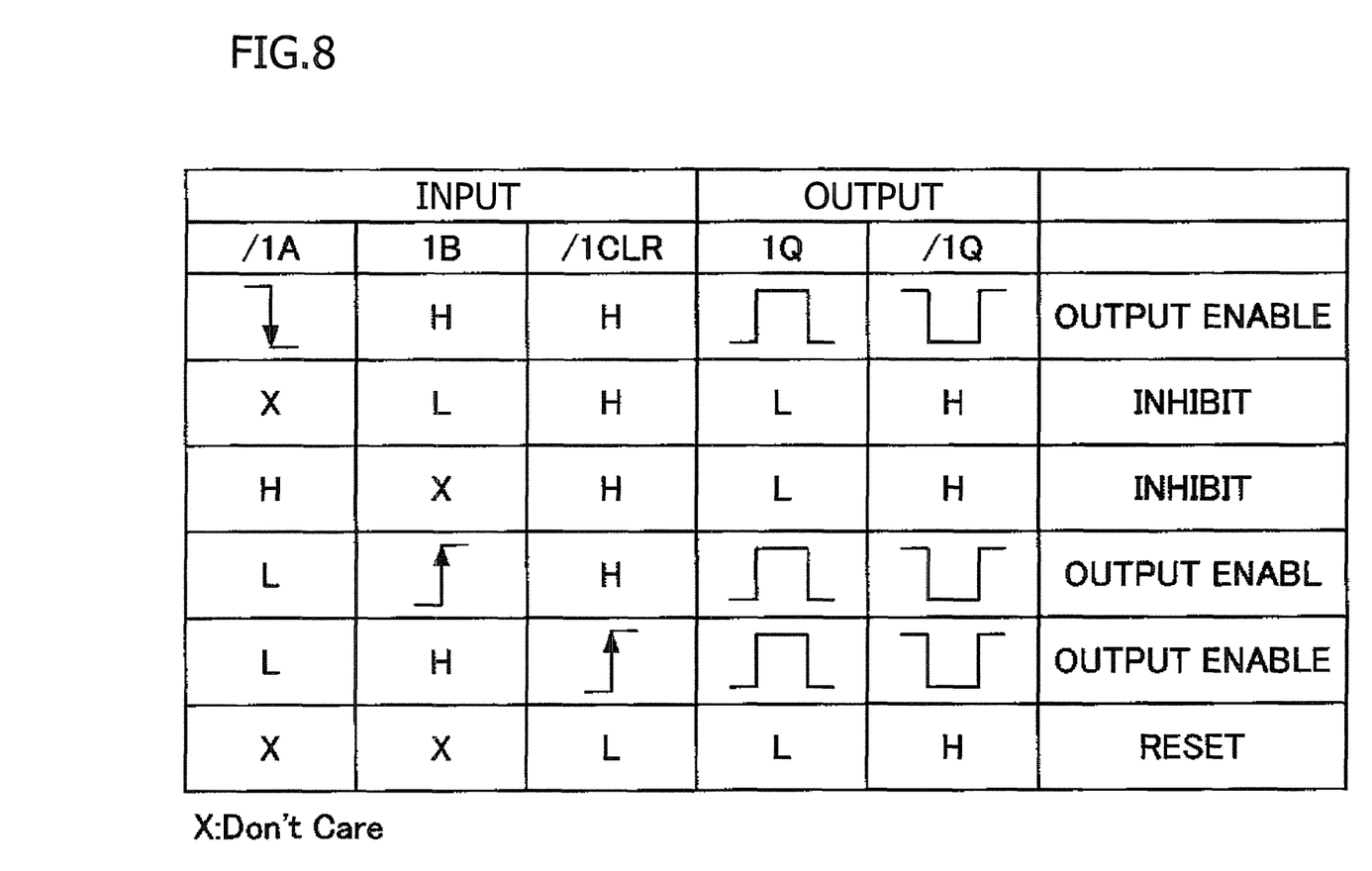
FIG. 8 is a truth table illustrating operation of the clock detection circuit in FIG. 7.
Figure 9:
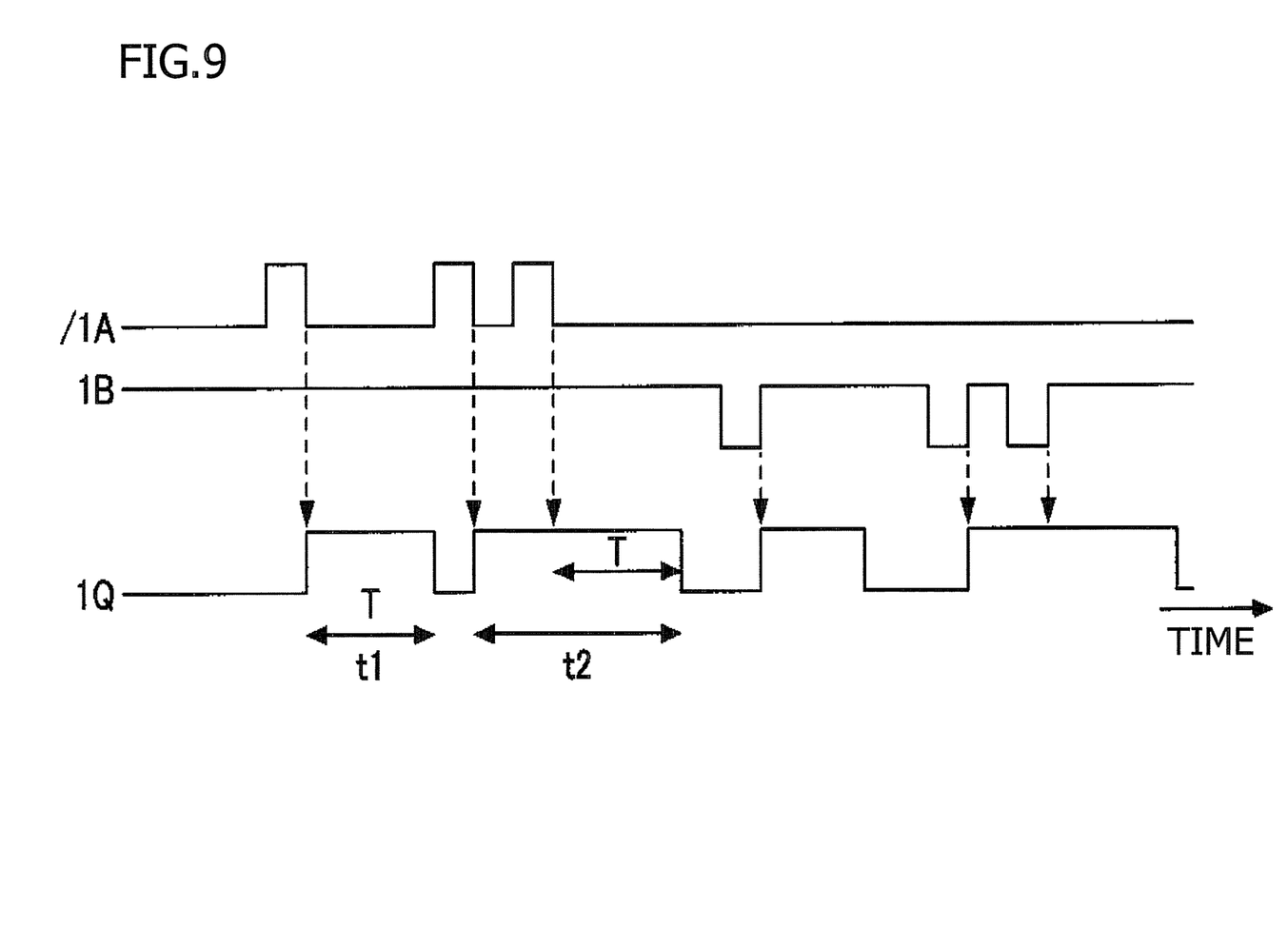
FIG. 9 is a timing chart illustrating operation of the clock detection circuit in FIG. 7.

FIG. 8 is a truth table illustrating operation of the clock detection circuit 134 in FIG. 7. FIG. 9 is a timing chart illustrating the operation of the clock detection circuit 134 in FIG. 7. FIGS. 8 and 9 illustrate only the input and output signals that directly relate to the operation of the clock detection circuit 134 among the signals input to and output from the chip HC123A. Description of the signals that do not directly relate to the operation will be omitted. In FIG. 8, L denotes the low level of the signal, H denotes the high level of the signal, and X denotes Don't Care.

Among the input signal of the chip HC123A, /1A represents a trailing edge trigger signal, 1B represents a leading edge trigger signal, and /1CLR represents a reset signal. Among the output signals of the chip HC123A, 1Q and /1Q are signal that are placed in a stable mode for a certain period of time after a trigger by a trigger signal. The certain period of time is determined by an external resistance and a capacitor connected to the inputs 1Cx and 1Rx/Cx.

As indicated by t1 in FIG. 9, an H-level output signal 1Q is output for a certain period of time T after the input of the trigger signal /1A. The time T is set with the external resistance and capacitor. When the next trigger signal /1A is input earlier than the predetermined period of time T set with the external resistance and capacitor, as indicated by t2, the trigger signal /1A takes effect and an H-level output signal 1Q is output for the certain period of time T after the last trigger. By using the behavior in t2, the H-level period of the output signal 1Q is made longer than one cycle of the clock CLK to hold the output signal /1Q high while the clock CLK is being input as the trigger signal /1A. When the input of the clock CLK stops, the output signal /1Q goes low, thereby the chip HC123A can detect the abnormality.

Step S5: When the clock detection circuit 134 in the SB 13-1 detects an abnormality of the clock CLK and outputs a detection signal CLK_DW to set the clock error bit in the error status held on the GPIO interface 136, the GPIO interface 136 sends an interruption signal INT to the MMB 16, thereby notifies the error.

Step S6: In response to the error notification by the interrupt signal INT, the MMB 16 reads the GPIO interface 136 in the SB 13-1 to check the error status.

Step S7: When the MMB 16 finds that the clock error bit is set in the error status held on the GPIO interface 136 in the SB 13-1, the MMB 16 clears the clock error bit and makes a setting on the GPIO interface 123 in the CB 12-1 to inhibit the CB 12-1 from supplying the clock CLK and also makes an setting on the GPIO interface 137 in the SB 13-1 to cause SB 13-1 deselect the clock CLK.

Step S8: The MMB 16 makes a setting to cause the GPIO interface 137 in the SB 13-1 to output a select signal SEL to the MUX 133 to cause the MUX 133 to select the clock from the CB 12-2, thereby causing switchover from the primary clock CLK to the standby clock CLK.

Step S9: In order to cause the standby clock CLK to be output, the MMB 16 makes a setting on the GPIO interface 123 in the CB 12-2 to place the CLK-DV 122 in the CB 12-2 in the output-enabled state.

Step S10: In order to start output of the clock CLK to each CPU 132 in the SB 13-1, the clock detection circuit 134, and each ASIC 135, the MMB 16 makes a setting on the GPIO interface 137 in the SB 13-1 to place the CLK-DV 131 in the output-enabled state.

After the switchover from primary clock CLK to the standby clock CLK, the SB 13-1 is rebooted, and the SB 13-1 restarts operation with the standby clock CLK. Since the failed CB 12-1 is in the shutdown state while the clock source is being switched to the standby CB 12-2, the failed CB 12-1 can be repaired or replaced.

Figure 10:
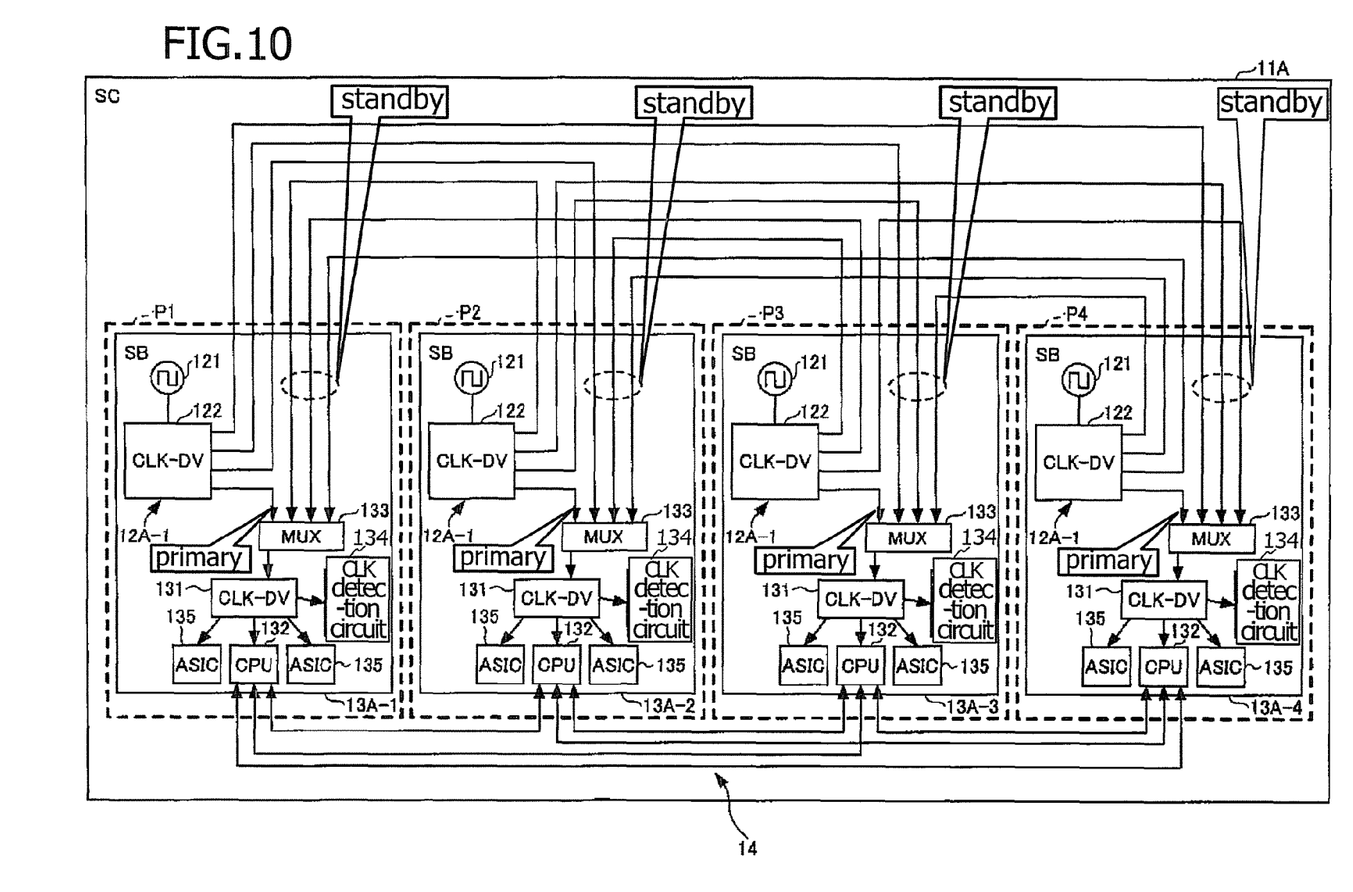
FIG. 10 is a block diagram illustrating a portion of an information processing apparatus according to a second embodiment of the present invention.

FIG. 10 is a block diagram illustrating a portion of an information processing apparatus according to a second embodiment of the present invention. Components in the FIG. 10 that are the same as those in FIG. 2 are labeled the same reference numerals and the description of those components will be omitted.

In the second embodiment, the CBs 12-1 and 12-2 depicted in FIG. 2 are not provided, but instead, clock supply units (or clock supply means) 12A-1 are provided in SBs 13A-1 to 13A-4, respectively. Each of the SBs 13A-1 to 13A-4 forms a processing unit (or processing means). Each of the clock supply units 12A-1 in SBs 13A-1 to 13A-4 includes a clock source 121 and a CLK-DV 122.

The CLK-DV 122 of each of the clock supply units 12A-1 in SBs 13A-1 to 13A-4 distributes and supplies a clock to the SBs 13A-1 to 13A-4, respectively. In each of the SB 13A-1 to 13A-4, a MUX 133 selects the primary clock from primary clock supply unit among the clocks from the clock supply units 12A-1 in SBs 13A-1 to 13A-4 and supplies the primary clock to each CLK-DV 131, respectively. For the SB 13A-1 in the example in FIG. 10, the clock supply unit 12A-1 in the SB13A-1 is the primary clock supply unit and the clock supply units 12A-1 in SBs 13A-2 to 13A-4 are the standby clock supply units. For the SB 13A-2, the clock supply unit 12A-1 in the SB 13A-2 is the primary clock supply unit and the clock supply units 12A-1 in SBs 13A-1, 13A-3 and 13A-4 are the standby clock supply unit. For the SB 13A-3, the clock supply unit 12A-1 in the SB 13A-3 is the primary clock supply unit and the clock supply units 12A-1 in SBs 13A-1, 13A-2 and 13A-4 are the standby clock units. For the SB 13A-4, the clock supply unit 12A-1 in the SB 13A-4 is the primary clock supply unit and the clock, supply units 12A-1 in SB 13A-1, 13A-2 and 13A-3 are the standby clock supply units. For convenience of illustration, FIG. 10 depicts the information processing apparatus partitioned into four partitions and SBs 13A-1 to 13A-4 form partitions P1 to P4.

In the example in FIG. 10, a clock from the clock source 121 of the clock supply unit 12A-1 in the SB 13A-1 is supplied to as the primary clock the SB 13A-1 which forms partition P1 and can also be supplied as a standby clock to the SBs 13A-2 to 13A-4 which form partitions P2 to P4, respectively. A clock from the clock source 121 of the clock supply unit 12A-1 in the SB 13A-2 is supplied as the primary clock to the SB 13A-2 which forms partition P2 and can be supplied as the secondary clock to the SBs 13A-1, 13A-3 and 13A-4 which form partitions P1, P3 and P4, respectively. A clock from the clock source 121 of the clock supply unit 12A-1 in the SB 13A-3 is supplied as the primary clock to the SB 13A-3 which forms partition P3 and can be supplied as the secondary clock to the SBs 13A-1, 13A-2 and 13A-4 which form partitions P1, P2 and P4, respectively. A clock from the clock source 121 of the clock supply unit 12A-1 in the SB 13A-4 is supplied as the primary clock to the SB 13A-4 which forms partition P4 and can be supplied as the secondary clock to the SBs 13A-1, 13A-2 and 13A-3 which form partitions P1, P2 and P3, respectively.

If the clock supply unit 12A-1 in the SB 13-A fails due to a failure such as a failure of its clock source 121, switchover is made from the primary clock supply unit 12A-1 in SB 13A-1 to one of functioning clock supply units 12A-1 in SBs 13A-2, 13A-3 and 13A-4 that can supply a standby clock, then the SB 13A-1 is rebooted, and the standby clock is supplied to the SB 13A-1. If the clock supply unit 12A-1 in the SB 13A-2 fails due to a failure such as a failure of its clock source 121, switchover is made from the primary clock supply unit 12A-1 in SB 13A-2 to one of functioning clock supply units 12A-1 in SBs 13A-1, 13A-3 and 13A-4 that can supply a standby clock, then the SB 13A-2 is rebooted, and the standby clock is supplied to the SB 13A-2. If the clock supply unit 12A-1 in the SB 13A-3 fails due to a failure such as a failure of its clock source 121, switchover is made from the primary clock supply unit 12A-1 in SB 13A-3 to one of the functioning clock supply units 12A-1 in SBs 13A-1, 13A-2 and 13A-4 that can supply a standby clock, then the SB 13A-3 is rebooted, and the standby clock is supplied to the SB 13A-3. Similarly, if the clock supply unit 12A-1 in the SB 13A-4 fails due to a failure such as a failure of its clock source 121, switchover is made from the primary clock supply unit 12A-1 in SB 13A-1 to one of functioning clock supply units SB 13A-1, 13A-2 and 13A-3 that can supply a standby clock, then the SB 13A-4 is rebooted, and the standby clock is supplied to the SB 13A-4.

Since there are three effective standby clock supply units to back up each primary clock supply unit, the second embodiment has virtually the effect of quadruple redundancy. Accordingly, the second embodiment can further reduce the probability of the entire system failing as compared with the first embodiment.

Figure 11:
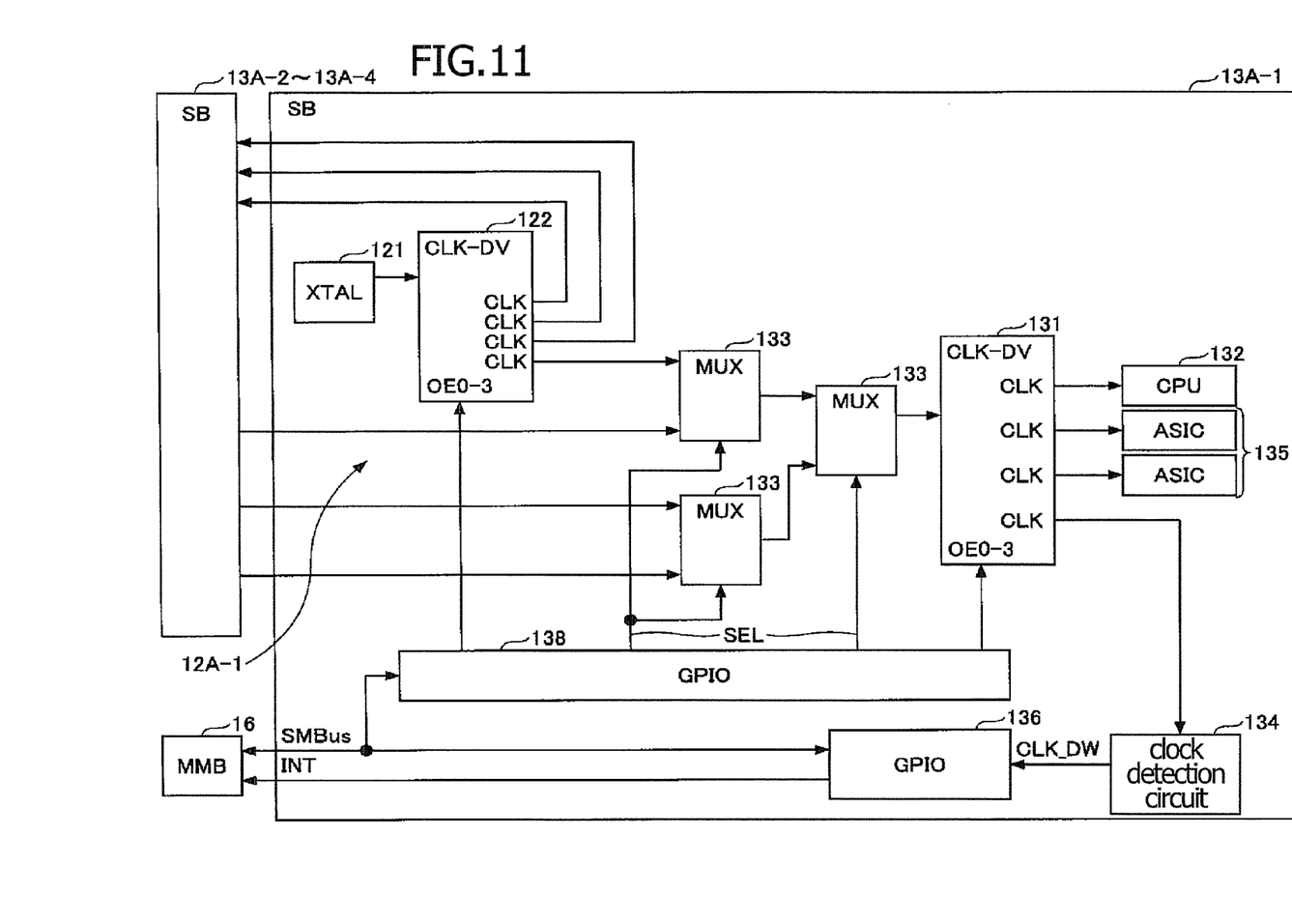
FIG. 11 is a block diagram illustrating a configuration of a portion of the information processing apparatus in FIG. 10 in further detail.

FIG. 11 is a block diagram illustrating a configuration of a portion of the information processing apparatus in FIG. 10 in further detail. Components in FIG. 11 that are the same as those in FIG. 6 are labeled the same reference numerals and description of those components will be omitted.

As illustrated in FIG. 11, the clock supply unit 12A-1 is provided in the SB 13A-1 and includes a clock source 121, a CLK-DV 122 and a GPIO interface 138. The GPIO interface 138 has the function of the GPIO interface 123 in the CB 12-1 and the function of the GPIO interface 136 in the SB 13-1 illustrated in FIG. 6. While the MUX 133 in the SB 13A-1 is formed by three MUXs, the MUX 133 may be formed by one or more MUXs. The other SBs 13A-2, 13A-3 and 13A-4 have the similar configuration as the SB 13A-1 and are therefore omitted from FIG. 11.

In a variation of the second embodiment in FIG. 10, if the SBs 13A-1 and 13A-2 are included in partition P1 and SBs 13A-3 and 13A-4 are included in partition P2, for example, a clock supply unit may be provided only in one of the SBs in each partitions P1 and P2. For example, the function of the CB12-1 depicted in FIG. 2 may be provided only in the SB 13A-1 and the function of the CB12-2 may be provided only in the SB 13A-3. This configuration is simpler than that in FIG. 10 and therefore can be manufactured at lower cost. Likewise, the function of CB may be provided in at least one SB in a group that uses the same CB as the primary CB.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiments of the present invention have been described in detail, it should be understood that the various changes, substitutions, and alterations could be made hereto without departing from the spirit and scope of the invention.

What is claimed is:

1. A clock supply method for supplying a clock to a plurality of processing units, comprising:
supplying a clock from a first clock supply unit to first processing units forming a first group among the plurality of processing units as a primary clock and to second processing units forming a second group among the plurality of processing units as a standby clock;
supplying a clock from a second clock supply unit including a clock source different from a clock source of the first clock supply unit to the second processing units as a primary clock and to the first processing units as a standby clock; and
switching, when one of the first processing units or one of the second processing units detects an abnormality of its primary clock, the standby clock into use in place of the primary clock being supplied to the one of the first and second processing units for which the abnormality of the primary clock is detected,
wherein the first and second clock supply units supply clocks with the same frequency and none of the plurality of processing units belong to both of the first and second groups at the same time.

2. The clock supply method according to claim 1, wherein the switching is made in each of the first and second processing units in the group to which the processing unit that has detected the abnormality belongs.

3. The clock supply method according to claim 1, wherein the first processing units form a first partition and the second processing units form a second partition.

4. The clock supply method according to claim 1, wherein each of the first processing units respectively forms different partitions.

5. The clock supply method according to claim 1, wherein the first and second clock supply units are provided separately from the first and second processing units.

6. The clock supply method according to claim 1, wherein the first clock supply unit is provided in at least one processing unit in the first processing units and the second clock supply unit is provided in at least one processing unit in the second processing units.

7. An information processing apparatus comprising:
a first clock supply unit supplying a clock;
a second clock supply unit supplying a clock;
first processing units in a first group supplied with the clock from the first clock supply unit as a primary clock and supplied with the clock from the second clock supply unit as a standby clock; and
second processing units in a second group supplied with the clock from the second clock supply unit as a primary clock and supplied with the clock from the first clock supply unit as a standby clock;
wherein each of the first and second processing units includes a detection circuit detecting an abnormality of a primary clock and a switching circuit switching the standby clock into use in place of the primary clock being supplied to one of the first and second processing units with which the abnormality clock is detected when the detection circuit detects an abnormality of the primary clock, and the first and second clock supply units supply clocks with the same frequency and none of the plurality of processing units belong to both of the first and second groups at the same time.

8. The information processing apparatus according to claim 7, wherein the first processing units form a first partition and the second processing units form a second partition.

9. The information processing apparatus according to claim 7, wherein each of the first processing units forms different partitions.

10. The information processing apparatus according to claim 7, wherein the first and second clock supply units are provided separately from the first and second processing units.

11. The information processing apparatus according to claim 7, wherein the first clock supply unit is provided in at least one processing unit in the first processing units and the second clock supply unit is provided in at least one processing unit in the second processing units.

12. The information processing apparatus according to claim 7, wherein each of the first processing units comprises:

a plurality of processors; and
a clock driver that distributes a clock supplied from the switching circuit to the plurality of processors.

13. The information processing apparatus according to claim 12, further comprising a management unit that controls the information processing apparatus, wherein:

when the detection circuit detects the abnormality of the primary clock, the detection circuit provides an error notification to the management unit; and in response to the error notification, the management unit inhibits the clock supply unit supplying the primary clock to the first processing units and inhibits the clock driver supplying the primary clock in the first processing units.

* * * * *